May 20, 1930.  H. D. TAPPAN  1,759,377
AUTOMOBILE BRAKE
Filed March 9, 1925

Inventor
Harry D. Tappan

Patented May 20, 1930

1,759,377

UNITED STATES PATENT OFFICE

HARRY D. TAPPAN, OF PHILADELPHIA, PENNSYLVANIA

AUTOMOBILE BRAKE

Application filed March 9, 1925. Serial No. 14,049.

My improvement relates to automobile brakes. The type of brakes improved is that where a revolving brake drum is pressed upon by a brake shoe that has a brake lining. The shoe with its lining conforms to the shape of the drum and contacts with it over almost its entire surface. The lining is made of a material that has resiliency, but in the type of brakes now on the market the brake depends upon friction alone for its effectiveness. The drum as used prior to my invention, and which is in general use to-day is smooth or roughened but not grooved, and therefore no internal friction is produced within the fabric of the lining, and no work is done by compressing the lining, both of which would tend to take up the force of the inertia of the car, and help to stop it.

My improvement is a modification of the form of the drum, which used in connection with a resilient brake lining, of the present type, takes advantage of this resiliency by causing it to change continually the local compression of portions of this lining thereby converting more rapidly than heretofore the forward motion of the car into heat, with the same amount of pressure of the brake shoe upon the drum. This additional heat production is produced originally in the lining but is transmitted from it to the metal part of the shoe and to the drum, and except in the case of an emergency stop does not materially shorten the wear of the lining.

Figure 4:
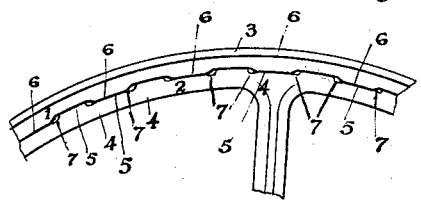
Figure 1:
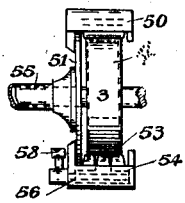
Figure 2:
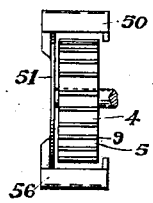
Figure 3:
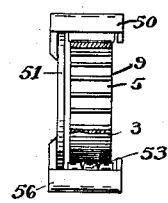
Figure 5:
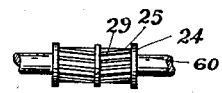

Fig. 1 is an elevation of a brake showing the relative positions of the various parts. Fig. 2, is a similar elevation with the brake shoe removed. Fig. 3 is an elevation, partly fragmentary, of the brake, part of the lining, and shoe being broken away. Fig. 4 is a diagrammatic side elevation of part of a drum and a part of a lining, showing the coaction of these parts. Fig. 5 is an elevation of a drum constructed according to my invention and placed on the main drive shaft.

Figure 10:
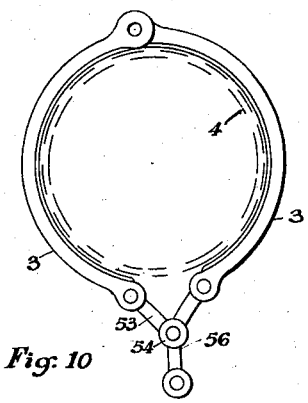
Figure 6:
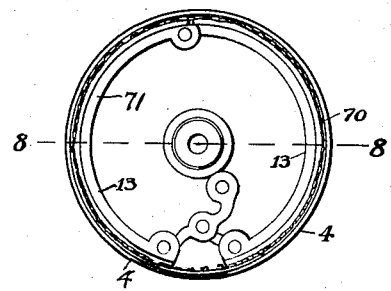
Figure 9:
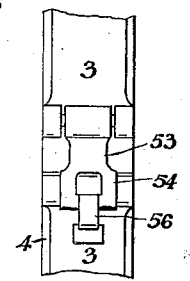
Figure 8:
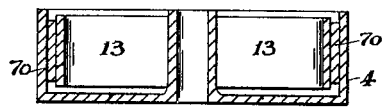
Figure 7:
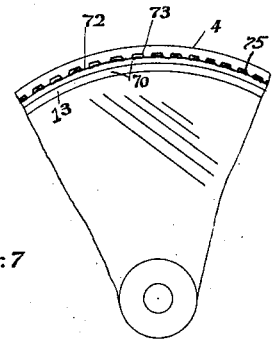

Fig. 6 is a side elevation of the device where the brake shoe is placed inside of the brake drum. Fig. 7 is an enlarged fragmentary elevation of the same. Fig. 8 is a cross section on Fig. 6 on the line 8—8. Fig. 9 is a detail of the device for expanding the brake shoe when placed interiorly, and Fig. 10 for contracting the brake shoe, when placed exteriorly.

The brake shoe 3, is a slightly flexible metal band of the usual form. It has a lining, 1, that is of any of the usual resilient lining materials. It can be mounted in any suitable manner. I have shown it pivoted to the bracket, 50, carried by the disc, 51, which is shown as mounted on the axle sheath, 55. A hanger, 56, carrying the toggle, 54, engaging by the link 53, with the brake shoe, 3 is shown attached to the disc, 51. The arm, 58, is shown for attachment to a brake link and operatively connected to the toggle, 54.

The surface of the drum, 4, instead of being smooth is slightly corrugated with the transverse grooves 5, 5, alternating with transverse ridges 7. In the best form of my improvement these grooves have the upper edges, 7, slightly rounded so as to meet obliquely the face of the lining contacting with the edges. These grooves operate in conjunction with the resilient brake lining, 1, to cause a friction in the body of the fabric by compressing and releasing the compression on it through the turning of the drum 4, with its alternating grooves 5 and projections 9. The edges of these projections 9 are rounded or slanted at their edges 7. The fabric of the lining is allowed to expand into the grooves slightly. By the revolution of the drum, 4, all parts of the lining are alternately compressed and permitted to expand and the resistance to the compression also serves to take up some of the forward movement of the car.

In Figs. 6, 7 and 8 is illustrated a form of device in which an expansion shoe 13, is positioned on the inside of the drum. In this case the brake lining 70 is on the outer side of the brake shoe 71. The ridges 72 and grooves 73 are placed on the inside of the drum. In Fig. 5 is shown a drum with the ridges 25, 25, and grooves 29, 29 cut diagonally.

When the car is braked, the shoe is fixed in position while the drum revolves, the shoe and its operating devices forcing and compressing the lining hard against the drum.

As the compression is of only part of its area, this part of the lining will be greatly compressed, forcing the parts, 6, of the lining opposite the grooves, 5, partly into them and causing the edges, 7, of the depression, 5, to press these projecting areas obliquely back, releasing the compressed areas continuously until the brake is released or the car ceases to move.

I claim:—

1. An automobile brake comprising in combination a brake drum, a brake shoe engaging co-operatively with the brake drum, a brake lining composed of a compressible and elastic material interposed between said brake shoe and brake drum, the brake drum composed of a hard unyielding material contacting with and moving frictionally upon said lining, and having its surface, so contacting with said lining, corrugated with transverse grooves having their edges slightly rounded so as to meet obliquely the face of the lining, and means for tightening the brake shoe upon said drum and lining.

2. In an automobile brake, a drum and a brake shoe forming the two permanent braking elements, in combination with means for tightening the permanent braking elements on each other, and a brake lining of compressible and elastic material, interposed between said permanent braking elements, and secured to one of said braking elements, the other of said braking elements being composed of a hard unyielding material contacting with and moving frictionally upon said lining and having its surface, so contacting with said lining, corrugated into transverse grooves having their edges slightly rounded so as to meet obliquely the face of the lining.

HARRY D. TAPPAN.